United States Patent

Sheng et al.

[11] Patent Number: 6,067,386
[45] Date of Patent: May 23, 2000

[54] METHOD AND SYSTEM FOR AUTOMATIC IMAGE-PROPERTY IDENTIFICATION FOR AN OPTICAL SCANNER

[75] Inventors: Gary Sheng, Taoyuan; Frun Leou, Hsinchu, both of Taiwan

[73] Assignee: Mustek Systems Inc., Hsinchu, Taiwan

[21] Appl. No.: 08/938,742

[22] Filed: Sep. 26, 1997

[51] Int. Cl.[7] .............................. G06K 9/00; G06K 9/48
[52] U.S. Cl. ............................................ 382/319; 382/199
[58] Field of Search ..................................... 382/190, 209,
382/199, 201, 206, 293, 318, 319, 204;
358/280, 282

[56] References Cited

U.S. PATENT DOCUMENTS

| | | | |
|---|---|---|---|
| 4,556,915 | 12/1985 | Shibata et al. | 358/280 |
| 4,616,269 | 10/1986 | Mori | 358/293 |
| 4,623,935 | 11/1986 | Mukai et al. | 358/280 |
| 4,823,395 | 4/1989 | Chikauchi | 382/282 |
| 5,522,657 | 6/1996 | Jamzadeh et al. | 382/319 |

Primary Examiner—Jose L. Couso
Assistant Examiner—Duy M. Dang
Attorney, Agent, or Firm—Harness, Dickey & Pierce, P.L.C.

[57] ABSTRACT

The automatic image-property identification is applied for a two-dimensional object on the document table of a scanner. Various informative frames are used for circumscribing the borders of the document sheets. Each frame type is associated with the image properties of a sheet size. The frame types and their associated image properties are stored in a template. When scanning, the program first detects the features of the frame type currently in use. After a frame type is found, the photoelectric converting device can directly read the image properties of the sheet from the template without a prescan.

8 Claims, 5 Drawing Sheets

METHOD AND SYSTEM FOR AUTOMATIC IMAGE-PROPERTY IDENTIFICATION FOR AN OPTICAL SCANNER

BACKGROUND OF THE INVENTION

A. Field of the Invention

The present invention relates to a method and system for automatic image-property identification for a scanner, especially for the information reading process of an optical scanner which requires a prescan.

B. Description of the Prior Art

The information reading process of a conventional optical scanner usually requires two steps: Prescan and complete scan. The prescan is mainly for finding the border of the sheet and its coordinates on the document tray. It reads the information of the sheet at a higher speed because its resolution requirement is only about 30 dpi. Then, the rough image of the original sheet will show on the screen for the user to circumscribe the desired region by dragging and clicking the mouse. After the region is determined, the photoelectric converting device will move to the target position for a complete scan. At this time, the speed of scanning is slower because it requires a higher resolution of about 600 dpi.

The disadvantages for this procedure are that it requires two steps and it could not automatically identify the image properties for the sheets of commonly-used sizes, such as 4A sheet, a 4×4 or 3×6 photo, slides or name cards. This disadvantage will turn out to be a burden for a user when he/she has to scan a large amount of sheets and especially on a routine bases.

SUMMARY OF THE INVENTION

Accordingly, it is an object of the present invention to provide an efficient method and system which can circumscribe the boundaries of sheets of predetermined sizes and read its image properties automatically without a prescan.

It is another object of the invention to provide a convenient method and system for reading the image properties of multiple uniform sheets together at one time.

It is a further object of the present invention to provide a method and system which can automatically read the image properties of a reflective sheet as well as a transparent sheet with an informative frame.

Briefly described, the invention includes a new method of automatic image property identification which includes the following steps: (1) Storing each frame type and its associated image properties in a template; (2) reading the boundary information of the sheet; (3) detecting which frame type is in use; and (4) reading the image properties of the sheet from the template according to the frame type found. Consequently, the photoelectric converting device can directly process the desired region of the image according to the image properties without a prescan.

The embodiments of the present invention preferably include a plurality of informative frames, a memory device, an identification device, and a photoelectric converting device. The informative frames have various types. The image information about the frame types and their associated image properties are stored in the memory device. When scanning, the boundary information is read and is sent to the identification device. The identification device compares the features found on the border of the frame to the predetermined features of existing frame types. If a matching correspondence is found, the frame type is forwarded to the memory device and worked as an index to read out the image properties of the sheet. Thus, the photoelectric converting device can process the image information of the sheet according to the image properties.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A conventional scanner requires a prescan because it needs the border information of the sheet. To save the step of prescan, the invention employs various informative frames for circumscribing the borders of the sheets. The informative frames have several types for adapting to sheets of various sizes. Each frame type serves as a cue for defining the image properties of a sheet, such as area, gray level, resolution, light contrast, etc. The information about the frame types and their associated image properties are stored in a template. Thus, the scanner can read the cue on the informative frame and then use it as an index to find the image properties from the template for the sheet. Consequently, the scanning procedure can get the boundary information of the sheet and its image properties without a prescan.

Accordingly, the invention creates various frame types for various commonly-used sheet sizes, such as A4 sheets, 3×5 or 4×6 photos, slides, or name cards. A user can choose the desired frame type and make sure that the sheet fits the slot perfectly. If the users have multiple sheets for scanning, such as slides, they can use the one designed for slides. The frame type for slides can arrange the slides in order for reading their images together by one pass.

Figure 1A:
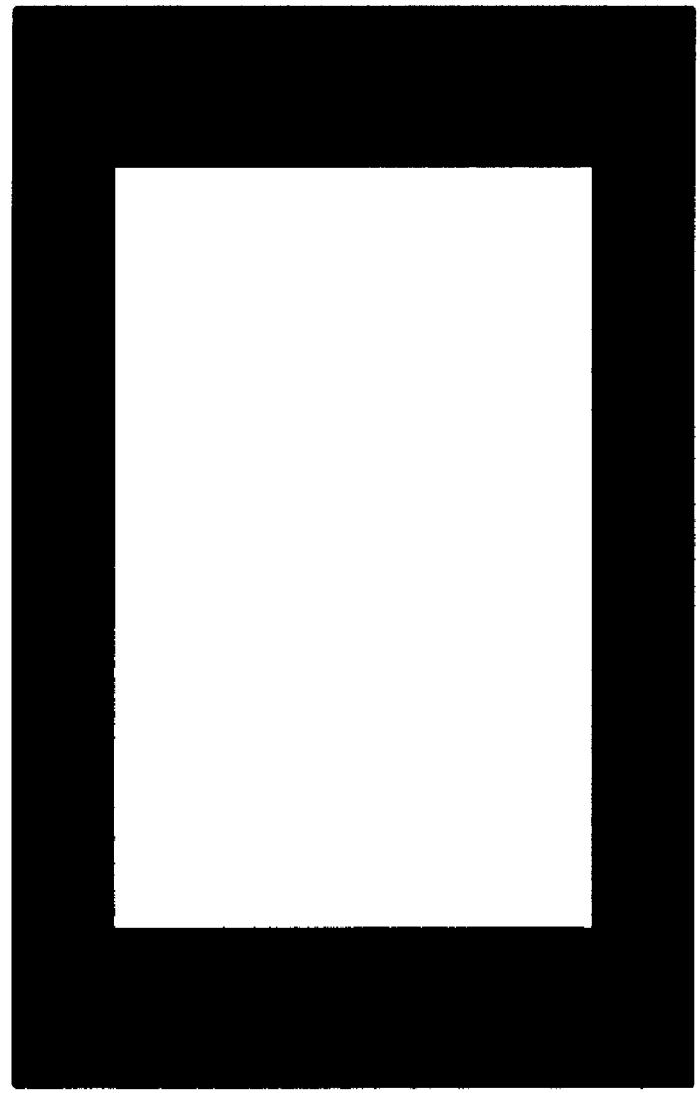
FIG. 1A is a schematic diagram showing the informative frame having a single slot according to the preferred embodiment of the invention.
Figure 1B:
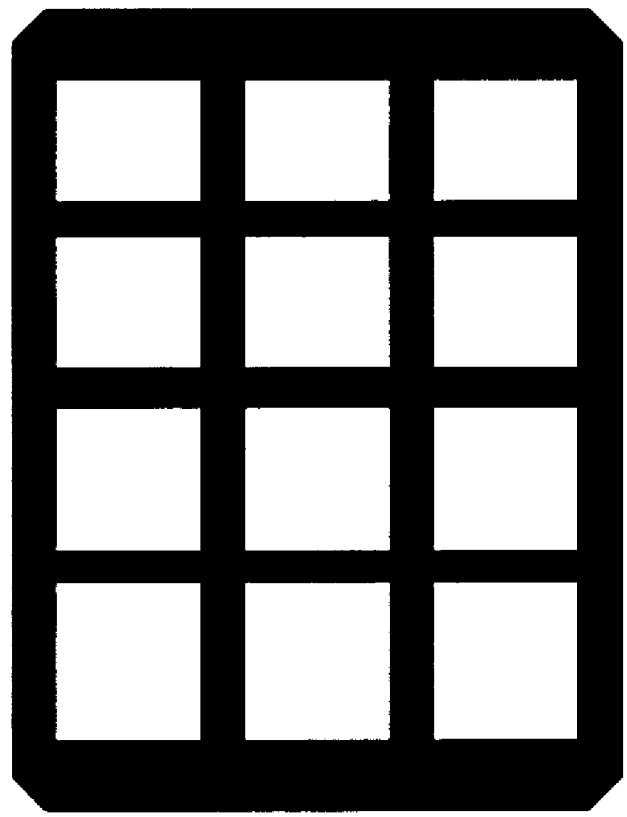
FIG. 1B is a schematic diagram showing the informative frame having multiple slots according to the preferred embodiment of the invention.

Each frame type has distinguishable features which will show on its border. For an illustration, the invention only discloses two frame types, one for a single sheet, the other for slides. Refer to FIG. 1A which is a rectangular, solid frame with four right angles and a single slot. On the other hand, FIG. 1B is a solid frame with four cutting angles and multiple slots. The features defined for a frame type for a single slot are therefore solid bands with right angles. The features defined for a frame type for slides are solid bands with cutting angles. We will use these features to distinguish their frame types. It shall be understood that the features shown in FIGS. 1A and 1B are only two examples. In practice, there may be other ways to represent their features, such as holes of different shapes, reflective labels, or even bar codes.

Figure 2:
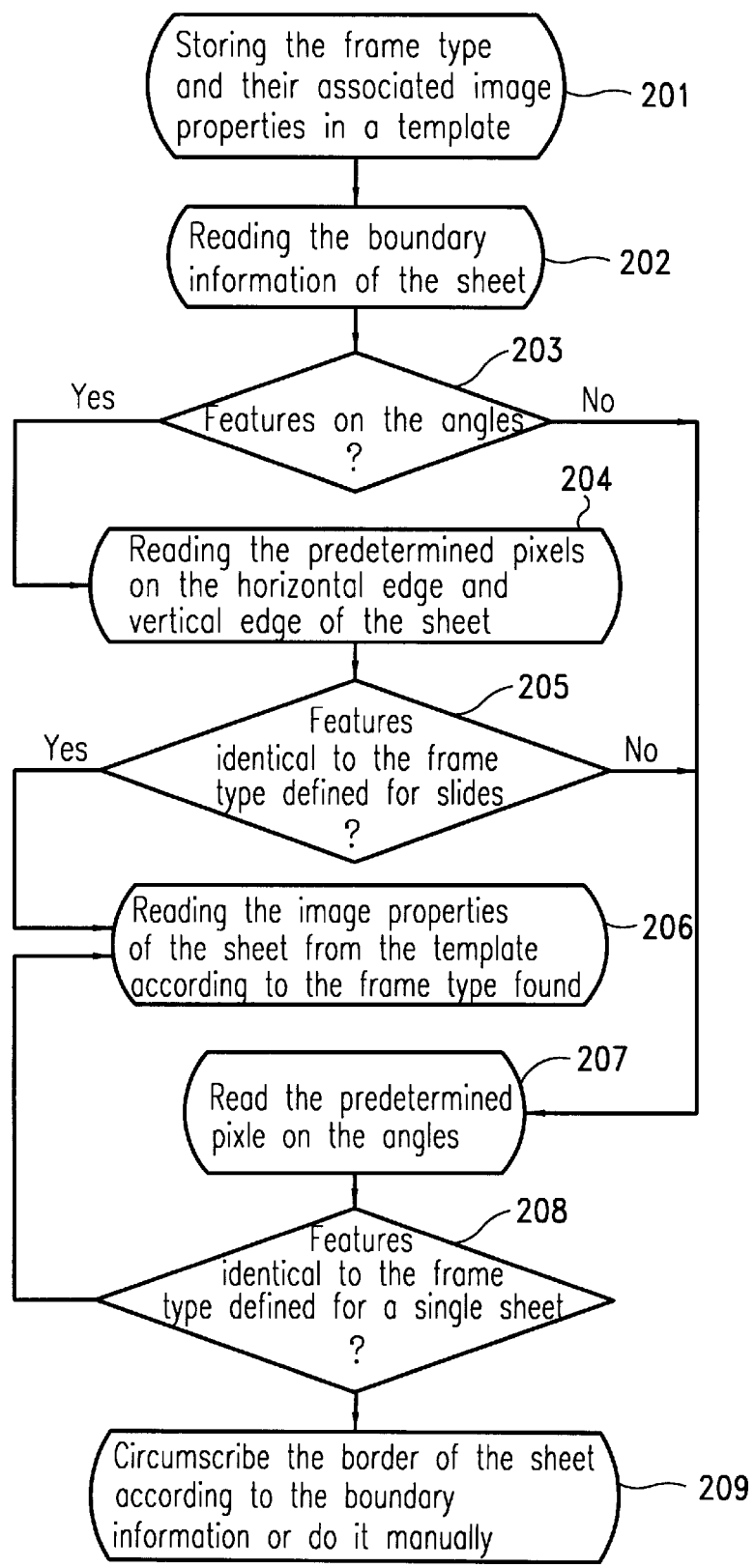
FIG. 2 is a flow chart showing the method of automatic image; property identification according to the preferred embodiment of the invention.

The frame types and their associated image properties are stored in a template. Therefore, if the frame type can be found, the image properties of the sheet can be read out from the template directly. Refer to FIG. 2 for the flow chart that shows the method of automatic image-property identification:

201. Storing the frame types and their associated image properties in a template. Each frame type with a distinguishable feature is based on a commonly-used sheet size. Therefore, if the feature of the frame type can be identified from the boundary information of the sheet, the image properties of the sheet can be retrieved directly from the template.

202. Reading the boundary information of the sheet. From the boundary information, we can get the coordinates of the sheet on the plane of the sheet table and the information necessary for identifying its frame type. Each frame type has a distinguishable feature on its border for showing light contrast. Filtering the boundary information of an object can help to read its size and relative location on the sheet table. When scanning, there are several possibilities, for instance, a frame containing a sheet, a frame containing no sheet, a sheet without any frame, or a multiple slot frame containing empty slots.

203. Filtering the boundary information. At present we only use two frame types: One for a single sheet (as shown in FIG. 1A), and the other for multiple slides (as shown in FIG. 1B). In practice, there can be many other kinds of frame types. To distinguish these two frame types, we uses informative light contrast on their borders. However, the frame type for a single sheet has no light contrast. Therefore, we can classify the features into two types: One has right angles and the other has cutting angles. These features can be distinguished from the light contrast on their borders. For instance, the light contrast of the pixels on the angles of the frame type in FIG. 1A will be all dark while the light contrast of the pixels on the angles of the frame type in FIG. 1B will be all bright. If the light contrast on the border reflects the frame type for slides, go to step 204, otherwise go to step 207.

Figure 3:
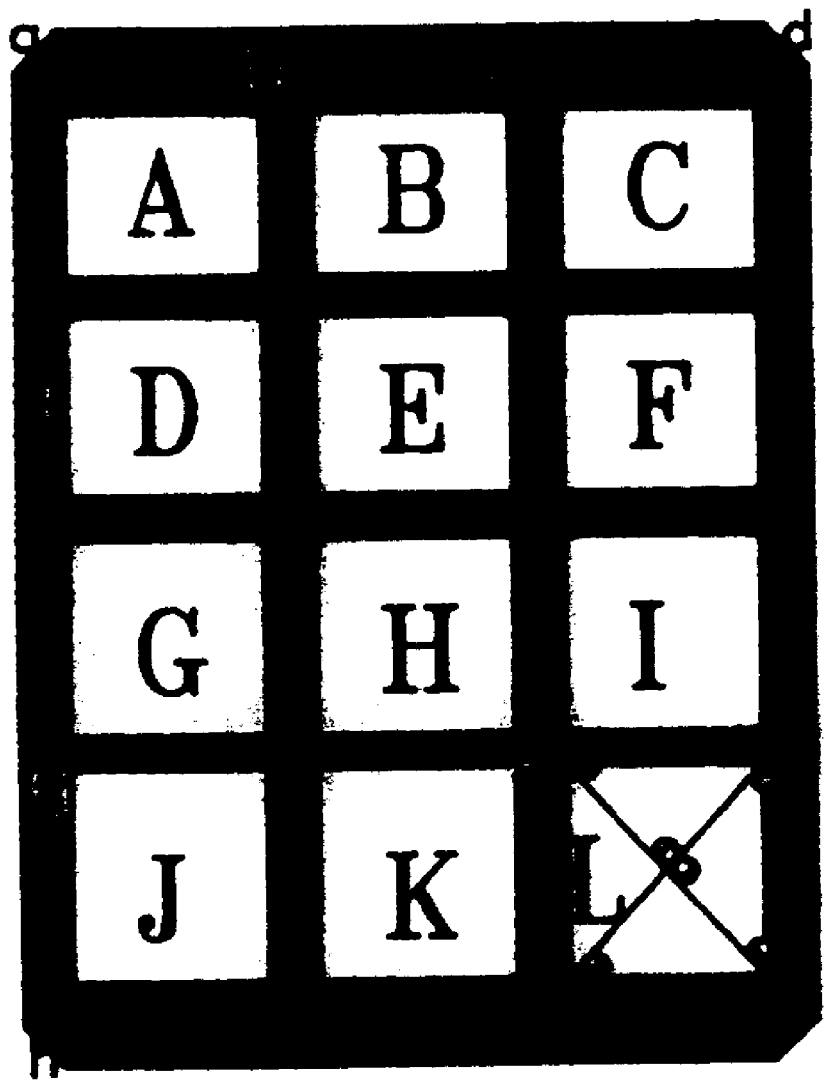
FIG. 3 is a schematic diagram showing the predetermined pixels checked for the frame type for slides.

204. Reading the predetermined pixels on the horizontal edge and the vertical edge of the sheet as shown in FIG. 3. In FIG. 3, the predetermined pixels are a, b, c, d, and e, f, g, h. This helps to precisely identify the features of the frame type.

205. Identifying the frame type for slides. Refer to FIG. 3 for an illustration. The predetermined pixels will be a, b, c, d, and e, f, g, h on the border of the frame. Since the frame has four cutting angles, so the light contrast on pixels a, d, and e, h, will be all bright while the rest are dark. Cutting angles are just one way to represent features. Holes of various shapes, reflective labels, or bar codes also work for this purpose. If the predetermined pixels correspond to these predetermined features, the sheet is determined to be circumscribed with a frame type for slides, so go to step 206. Otherwise, go to step 207.

206. Reading the image properties of the sheet from the template according to the frame type found. Since there are only two frame types defined, there will only be two entries in the template. In practice, if there are several frame types defined for various sheets, there shall be equal number of entries recorded in the template.

Figure 4:
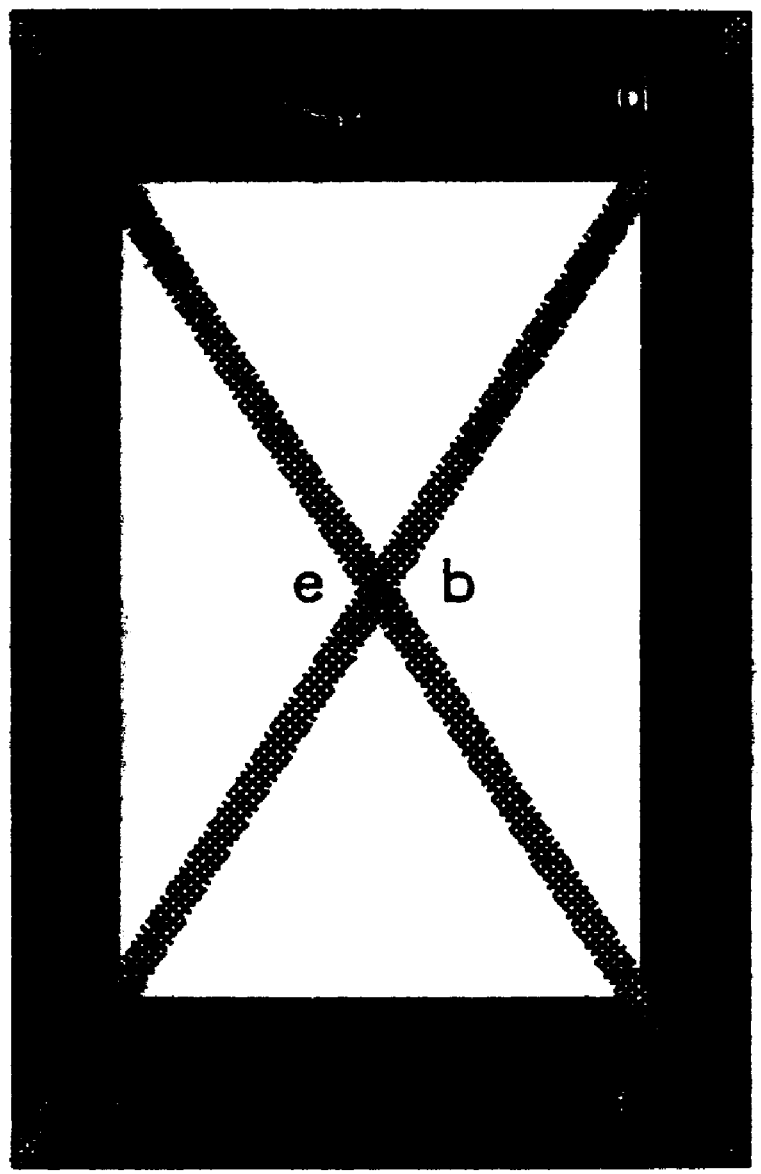
FIG. 4 is a schematic diagram showing the predetermined pixels checked for the frame type of a single slot.

207. If the boundary information of the sheet shows a solid border, apply edge detection to read the predetermined pixels on the angles. Refer to FIG. 4, that means reading the pixels on a, b, c, and d, e, f.

208. Identifying the frame type for a single sheet. Refer to FIG. 4, read the predetermined pixels a, b, c, d, e, and f. If the pixels e, b are bright and the rest are dark, we determine that the sheet is applying the frame type defined for a single sheet, so go to step 206. If not, go to step 209.

209. If the sheet does not appear to be circumscribed by any frame, circumscribe the border of the sheet according to the boundary information or do it manually.

In step 206, it should be understood that since the frame type predetermined for slides may contain empty slots, so a check for empty slots shall be performed before reading its image properties. There are several ways to detect empty slots. For instance, as shown in FIG. 3, in the slot marked as "L", if the predetermined pixels on the intersection of the diagonals of the slot are all bright, it means the slot contains no sheet. Otherwise, there exists a sheet. This empty slot detection also works for the frame type predetermined for a single sheet.

Accordingly, the system of the invention mainly encompasses a plurality of informative frames, a memory device, an identification device, and a photoelectric converting device. The informative frames have various types to fit sheets of various sizes. Each frame type has distinguishable features, such as cutting angles, right angles or holes on the border. The image information about the frame types and their associated image properties are stored in the memory device. When scanning, the information reading device reads the boundary information of the sheet and sends it to the identification device. The identification device compares the features found on the border of the sheet to the predetermined features of existing frame types. If a correspondence is found, the frame type is forwarded to the memory device. The memory device will use the frame type found as an index to read out the image properties of the sheet. The image properties of the sheet is then sent to the photoelectric converting device for processing the image information of the sheet. If no correspondent frame type is found, the user can circumscribe the sheet by dragging and clicking the mouse. Or, the photoelectric converting device will use the boundary information of the sheet to circumscribe the border of the sheet.

Apparently, the invention can improve the functions of a conventional scanner by skipping the step of prescan. The invention can take its full advantage if the user scan sheets of commonly-used sizes. The invention can apply to reflective sheets as well as transparent sheet. More importantly, the frame type for slides can help to organize the slides in order and read them together by one pass. These advantages can make the scanner more easy to use and make the scanning software application more efficient.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for automatic image-property identification for an object placed on top of a sheet table of an image reading apparatus comprising the steps of:

storing a plurality of frame types and their associated image properties in a template;

reading the boundary information of said object;

reading the predetermined pixels on the horizontal edge and the vertical edge of said object when said boundary information shows non-solid bands;

determining that said object is circumscribed with an informative frame for multiple sheets when the features of said boundary information is correspondent to the predetermined features for multiple sheets;

reading the predetermined pixels on the intersection of the diagonals of said sheet when said features are not correspondent to the predetermined features for multiple sheets;

determining that said object is circumscribed with a predetermined frame type for a single sheet when the features of said predetermined pixels are correspondent to the predetermined features for a single sheet;

determining that said object is not circumscribed with a predetermined frame type when the features of said predetermined pixels are not correspondent to the predetermined features for a single sheet;

reading the image properties of said object from said template according to said predetermined frame type; and reading the image information of said object according to said image properties.

2. The method as claimed in claim 1, wherein said object is a reflective sheet or a transparent sheet.

3. The method as claimed in claim 1, wherein said predetermined feature of said frame type for a single sheet comprises solid bands.

4. The method as claimed in claim 1, wherein said predetermined feature of said frame types for multiple sheets comprises cutting angles, holes, reflective labels, and bar codes.

5. A system for automatic image-property identification for an object placing on a sheet table of an optical scanner comprising:

a plurality of frame types selectable for circumscribing the borders of sheets of various sizes, said frame types comprising predetermined features for distinguishing multiple sheets and a single sheet;

memory means for storing the information about said predetermined features for said plurality of frame types and their associated image properties;

means for reading the image information of said object, and the boundary information thereof;

means for detecting the frame type of said object from said boundary information thereof;

means for retrieving the image properties of said object from said memory means in response to said frame type detected for said object; and means for processing the image information of said object according to said image properties.

6. The system as claimed in claim 5, wherein said predetermined feature of a frame type for a single sheet comprises solid bands.

7. The system as claimed in claim 5, wherein said predetermined feature of a frame type for multiple sheets comprises cutting angles, holes, reflective labels, and bar codes.

8. The system as claimed in claim 5, wherein said image properties comprises area, gray level, resolution, and light contrast.

* * * * *